(No Model.) 2 Sheets—Sheet 2.
A. M. ACKLIN.
CONVEYER.
No. 605,621. Patented June 14, 1898.
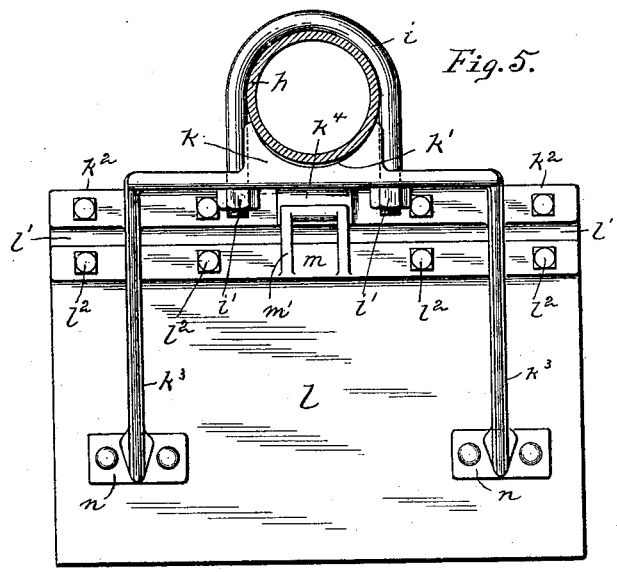
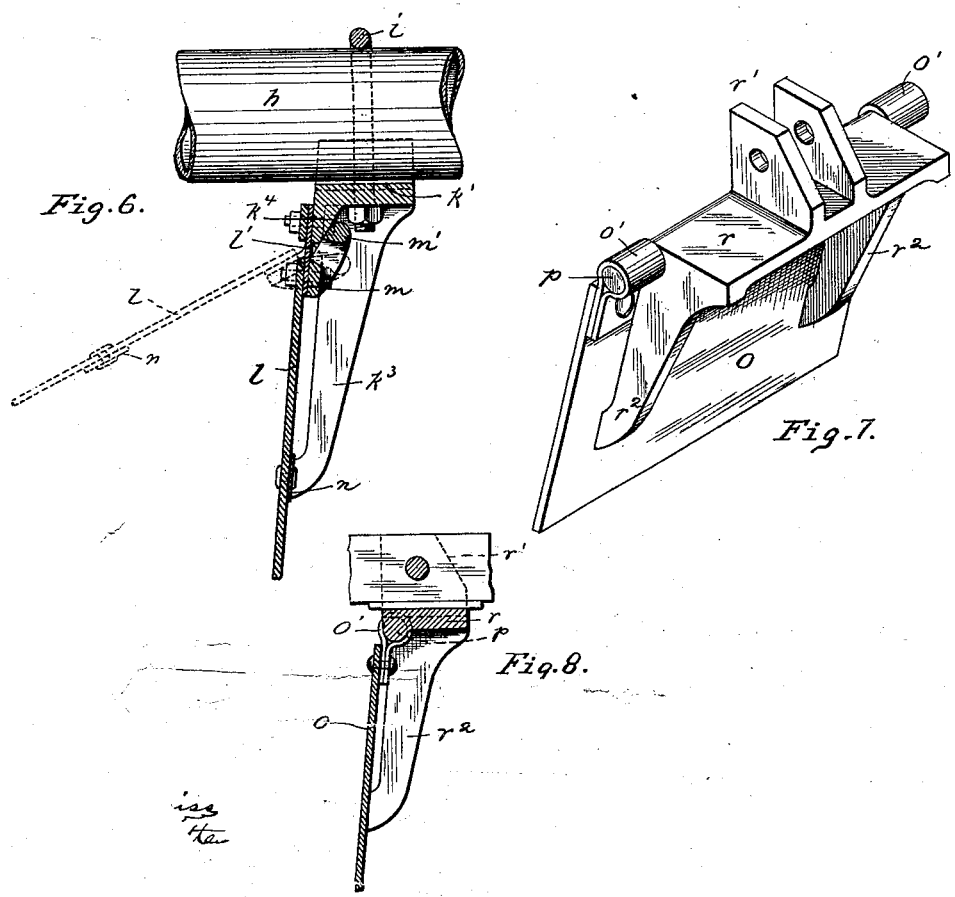

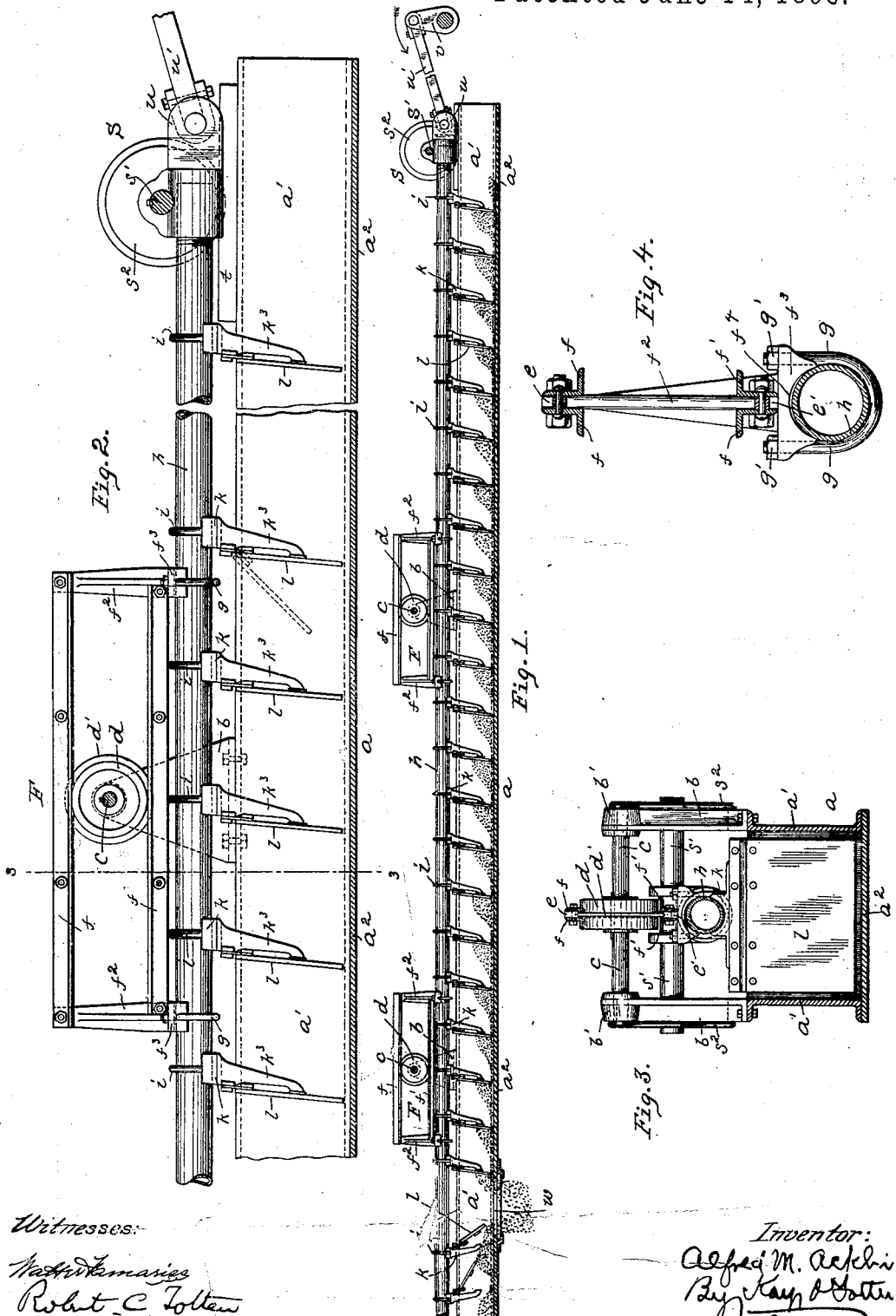

UNITED STATES PATENT OFFICE.

ALFRED M. ACKLIN, OF PITTSBURG, PENNSYLVANIA, ASSIGNOR TO HEYL & PATTERSON, OF SAME PLACE.

CONVEYER.

SPECIFICATION forming part of Letters Patent No. 605,621, dated June 14, 1898.

Application filed January 15, 1897. Serial No. 619,327. (No model.)

*To all whom it may concern:*

Be it known that I, ALFRED M. ACKLIN, a resident of Pittsburg, in the county of Allegheny and State of Pennsylvania, have invented a new and useful Improvement in Conveyers; and I do hereby declare the following to be a full, clear, and exact description thereof.

My invention relates to conveyers.

My invention comprises certain novel features in conveyers, all of which will be fully hereinafter set forth and claimed.

To enable others skilled in the art to make and use my invention, I will describe the same more fully, referring to the accompanying drawings, in which—

Figure 1 is a longitudinal view of my improved conveyer, showing the trough in section. Fig. 2 is a like view, on an enlarged scale. Fig. 3 is a section on the line 3 3, Fig. 2. Fig. 4 is a detail view of the reciprocating frame. Fig. 5 is a rear view of one of the flights and the manner in which it is connected to the reciprocating frame. Fig. 6 is a cross-section of the same. Figs. 7 and 8 are views of a modified form of flight.

Like letters indicate like parts in each of the figures.

The letter $a$ in the drawings designates a trough or like inclosure containing the sand, ashes, or other material to be conveyed and which may be introduced into said trough in any suitable manner. This trough $a$ is preferably formed of the channel-bars $a'$, constituting the sides and the bottom $a^2$, riveted together.

Resting on the upper flanges of the channel-bars $a'$ and secured thereto at suitable intervals are the standards $b$, said standards having the bearings $b'$ at their upper ends, in which the shafts $c$ are journaled. Keyed to the shafts $c$ are the wheels $d$, said wheels having the annular ribs $d'$ formed on their peripheries. These annular ribs $d'$ of the wheels $d$ are adapted to enter the slots $e\ e'$ of the frame F. The frame F is composed of the horizontal and parallel angle-bars $f\ f'$, bolted together and secured at their ends to the uprights $f^2$, whereby the slots $e\ e'$ are formed, with which the annular ribs $d'$ of the wheels $d$ engage. The uprights $f^2$ have the bases $f^3$ formed thereon, said bases having the concave seats $f^4$.

Depending from the bases $f^3$ of the uprights $f^2$ are the U-shaped bolts $g$, held in place by the nuts $g'$. These U-shaped bolts $g$ support the cylindrical bar $h$. While I have illustrated this bar $h$ as cylindrical and in the form of a pipe, yet I do not limit myself to any particular form of bar, as a solid bar or one different in cross-section may be employed, if desired. Where I employ a cylindrical bar such as illustrated, the concave seat $f^4$ of the base $f^3$ is made on a smaller curve than the circumference of the cylindrical bar in order to obtain a tighter hold on said cylindrical bar when the nuts $g'$ of the bolts $g$ are tightened up and at the same to take up any wear which might tend to loosen said bar.

U-shaped bolts $i$ engage with the bar $h$, said bolts being arranged at suitable intervals apart, and depending from said bolts and secured thereby are the flight-frames $k$, said flight-frames having the concave recesses $k'$ engaging with the lower faces of the bar $h$, said concave recesses being on a smaller curve than the circumference of said bars for the purpose, as hereinbefore stated, of securing a tight connection between the flight-frames and said bar. The nuts $i'$ hold said flight-frames in position. The flight-frames $k$ have the horizontal strip $k^2$ formed thereon and the downwardly-projecting arms $k^3$. The strip $k^2$ has the inclined face $k^4$ formed thereon. The flight $l$ has the leather or like flexible hinge $l'$ secured thereto along its upper edge by means of the bolts $l^2$, a metal strip $m$ extending along the rear face of said flight, said hinge $l'$ being interposed between said strip and the rear face of said flight. This strip $m$ has the upwardly-extending projection $m'$, adapted to engage with the inclined face $k^4$ on the flight-frame. Pieces of leather $n$ or other suitable material may be secured to the rear faces of the flight $l$ at the points where the lower ends of the arms $k^3$ impinge said flight to reduce the noise when the conveyer is in operation.

While the leather or like flexible hinge just described may be suitable where the conveyer is used for conveying sand or like material, yet where it is desired to convey hot ashes such leather hinge would not be able to stand the wear and tear. Accordingly in Figs. 7 and 8 I have set forth the form of flight and flight-frame suitable for conveying such materials as ashes. In that case the flight $o$ has the metal bearings $o'$ secured thereto, within which the journals $p$ on the flight-frame $r$ engage, so as to form an ordinary metal hinge. The flight-frame $r$ has the square seat $r'$ formed therein, into which a square bar may be inserted where the cylindrical bar $h$ is not employed. The flight-frame $r$ has the downwardly-projecting arms $r^2$, which support the flight $o$ from the rear.

At one end of the bar $h$ is the carriage $s$, said carriage having a threaded seat therein with which the threaded end of the bar $h$ engages. Keyed in said carriage is the axle $s'$, on which are mounted the flanged wheels $s^2$, said wheels having flanges on their outer edges and being adapted to move on the rails $t$, secured to the upper flanges of the channel-bars $a'$. Secured to the projections $u$ on said carriage is the pitman $u'$, which is connected at its opposite end to the crank $v$, which may be driven in any suitable manner, said crank being so arranged, as shown in Fig. 1, that when rotating in the direction of the arrow the throw of the pitman will be downward in such a way as to hold said carriage upon the rails $t$, or when the crank is in its lowest position the downward pull on the part of said pitman will tend to likewise hold said carriage down upon the rails. It is apparent, however, that any suitable means may be employed for reciprocating the rod $h$.

The operation of my improved conveyer is as follows: With the parts in the position shown in Figs. 1 and 2, as the bar $h$ moves forward the flights, being supported in their rear by the arms $k^3$ against backward movement, will advance the contents of the trough in the direction of the movement of the bar $h$. Upon the opposite movement, however, of the bar $h$ the flight-moving in contact with the contents of the trough will be swung forward to the position shown in dotted lines. As the movement of the bar $h$ is again reversed the flights will be swung back against the arms $k^3$, resuming the positions shown in full lines in Figs. 1 and 3 and again causing the contents of the trough to make a farther advance. In this manner by the continuous reciprocation of the bar $h$ the contents will be advanced through the trough, and where it is desired to work from both ends of the trough the opening $w$ may be formed at or about the middle of the trough, and the flights on opposite sides of said opening may be arranged in reverse positions, so that the contents of the trough will be fed from opposite directions to said openings. The action of the swinging flights when moving in contact with the materials to be conveyed will have a tendency to force up the bar $h$. This tendency of the bar $h$ to rise, however, is obviated by the lower bars $f''$ of the frame F coming in contact with the wheel $d$, the slot $e'$ in said bar receiving the rib $d'$ of said wheel. In this manner the swinging flights are always kept down within the trough and move in close contact with the bottom thereof. Where the leather hinge is employed, the leather is liable to buckle or bend as the flight engages the material and drives it forward. This, however, is prevented by the projection $m'$ on the metal strip $m$ on the rear of the flight engaging with the inclined face $k^4$ on the flight-frame. This projection engaging with the face $k^4$ in this manner acts to support the leather and prevent its buckling, whereby the wear on the leather is greatly diminished.

I wish it to be understood that I do not limit myself in any way to the particular construction of parts shown, as these may be varied to suit different circumstances and conditions without affecting the scope of my invention.

What I claim as my invention, and desire to secure by Letters Patent, is—

1. In a conveyer the combination with a suitable receptacle, of a reciprocating bar, a U-bolt engaging said bar, a flight-frame secured to said U-bolt, nuts engaging the free ends of said U-bolt to hold said flight-frame thereon, a swinging flight on said flight-frame, said flight being supported against backward movement, substantially as set forth.

2. In a conveyer the combination with a suitable receptacle, of a reciprocating bar having a rounded contour, a U-bolt engaging the rounded portion of said bar, a flight-frame secured to said U-bolt, nuts engaging the free ends of said U-bolt to hold said flight-frame thereon, said flight-frame having a concave recess with which said reciprocating bar engages, a swinging flight on said flight-frame, said flight being supported against backward movement, substantially as set forth.

3. In a conveyer, the combination with a suitable receptacle of a reciprocating frame, flight-frames supported thereby, flights, hinges of flexible material connecting said flight-frames and flights, and means on said flight-frames for supporting said flights against backward movement, substantially as set forth.

4. In a conveyer, the combination with a suitable receptacle of a reciprocating bar, a flight-frame supported thereby, a flight, a hinge of flexible material connecting said flight-frame and flight, means on said flight-frame for supporting said flight against backward movement, and a projection on the rear face of said flight engaging the rear face of said flight-frame to support said hinge, substantially as set forth.

5. In a conveyer, the combination with a suitable receptacle of a reciprocating frame, a flight-frame supported thereby, a flight, a hinge of flexible material connecting said flight-frame and flight, means on said flight-frame for supporting said flight against backward movement, and a projection on the rear face of said flight engaging an inclined face of said flight-frame to support said hinge, substantially as set forth.

6. In a conveyer, the combination with a suitable receptacle of a reciprocating frame, a flight-frame supported thereby, a flight, a hinge of flexible material connecting said flight-frame and flight, said flexible material being interposed between the rear face of said flight and a strip secured to said flight, said strip having a projection thereon adapted to engage with an inclined face on said flight-frame, substantially as set forth.

7. In a conveyer, the combination with a suitable receptacle, standards on said receptacle, a wheel journaled in said standards, a frame supported by said wheel, a bar supported thereby, swinging flights depending from said bar, said flights being supported against backward movement, and mechanism for reciprocating said bar, substantially as set forth.

8. In a conveyer, the combination with a suitable receptacle of standards on said receptacle, shaft in said standards, wheel on said shaft, said wheel having an annular rib on its periphery, a frame supported by said wheel, said frame having a slot into which the rib on said wheel enters, a bar supported by said frame, flights depending from said bar and entering said trough, said flights being supported against backward movement, and mechanism for reciprocating said frame, substantially as set forth.

9. In a conveyer, the combination with a suitable receptacle, of standards on said receptacle, a shaft in said standards, a wheel on said shaft, said wheel having an annular rib on its periphery, a frame supported by said wheel, said frame being composed of parallel bars, the upper of said parallel bars having a slot therein into which the rib on said wheel enters, the lower of said parallel bars having a like slot therein into which the rib on said wheel is adapted to enter, a bar supported by said frame, flights depending from said bar and entering said trough, said flights being supported against backward movement and mechanism for reciprocating said frame, substantially as set forth.

In testimony whereof I, the said ALFRED M. ACKLIN, have hereunto set my hand.

ALFRED M. ACKLIN.

Witnesses:
ROBT. D. TOTTEN,
ROBERT C. TOTTEN.